*INVENTORS*
William E. Geer
BY Elmer R. Wilfley

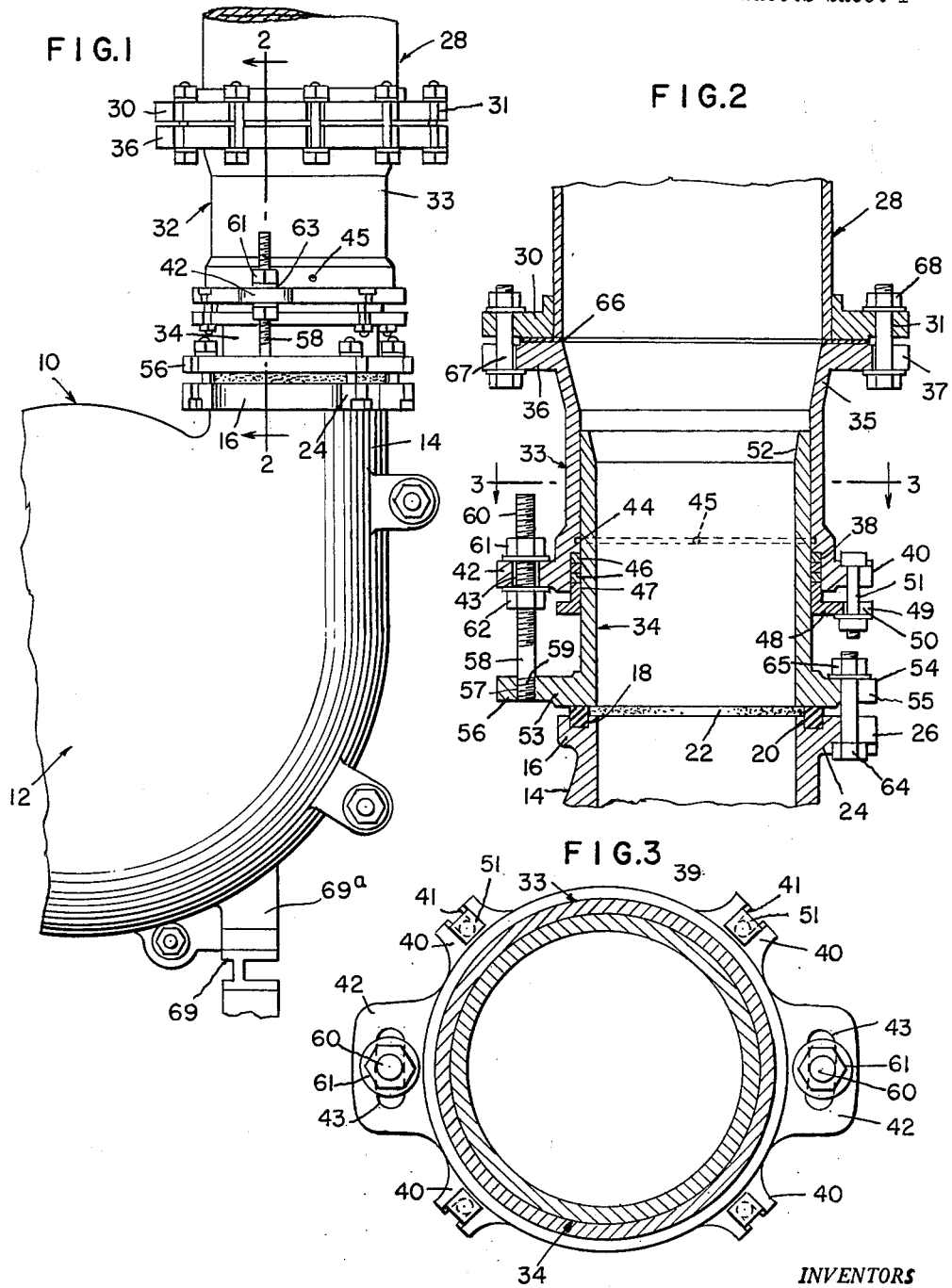

*ATTY.*

United States Patent Office 3,131,642
Patented May 5, 1964

3,131,642
STANDPIPE CONNECTION FOR
CENTRIFUGAL PUMPS
William E. Geer and Elmer R. Wilfley, Denver, Colo.,
assignors to A. R. Wilfley and Sons, Inc., Denver, Colo.,
a corporation of Colorado
Continuation of application Ser. No. 812,916, May 13,
1959. This application Nov. 30, 1962, Ser. No. 242,047
2 Claims. (Cl. 103—111)

This invention relates to improvements in standpipe connections for centrifugal pumps.

This application is a continuation of U.S. Serial No. 812,916, filed May 13, 1959, now abandoned.

In the operation of centrifugal pumps, and particularly centrifugal sand pumps, where the pumps have connection with standpipes or a discharge piping having any position with respect to the outlet of the centrifugal pump, it becomes necessary frequently to disconnect the pump from the discharge piping so that the pump may be serviced or replaced. Where the centrifugal pump is coupled with an overhead or hanging standpipe the use of conventional bolt-joined coupling flanges is impractical because this would entail the taking apart of the pipe with which the pump is coupled and such pipes or pipelines are usually relatively long and heavy.

Couplings for use between centrifugal pumps and the standpipes into which they discharge, have been devised which facilitate the provision of a spacing between the pump case outlet and the standpipe so that removal of the pump can be effected, but such couplings have associated with their construction and operation certain undesirable features which include the necessity of elevating the standpipe and this is highly impractical for the reason, as hereinbefore stated, that such pipes are usually very heavy and furthermore provision has to be made whereby they can be shifted.

In other cases, the known connections are designed so that the connection itself must be elevated from the centrifugal pump casing outlet and in such elevation the connection must shift or elevate the standpipe with which it is joined.

A problem associated with the provision of a coupling between a centrifugal pump case outlet and a standpipe or discharge pipe is to provide a means whereby the desired separation may be effected between the discharge piping or standpipe and the pump casing outlet without elevating the standpipe so that the standpipe may be suspended or mounted in a fixed or nonmovable position.

A particular object accordingly is to provide a coupling between a fixed standpipe and the outlet of a centrifugal pump casing wherein the end of the coupling which joins the pump casing outlet may be axially shifted to provide the desired clearance to permit removal of the centrifugal pump from its working location.

Another object of the present invention is to provide a coupling of the character stated employing bolt-connected flanges between the coupling and the centrifugal pump casing outlet with novel means whereby the axially shiftable portion of the coupling may be returned to its former coupled relation with the centrifugal pump casing outlet with the bolt-receiving openings of the adjoining flanges accurately aligned one with another to facilitate the easy and quick replacement of the bolts and the drawing of the joined flanges into firm fluid-tight connection.

Still another object of the invention is to provide in a coupling of the character stated a means whereby a slight angular or circular adjustment of the one of the parts of the coupling which directly joins the centrifugal pump casing outlet may be effected in the possible event that the bolt holes or bolt openings of the joined flanges should not be perfectly aligned after the pump casing has been reset following its removal.

It is another object of the present invention to provide a novel coupling unit for connection between a centrifugal pump casing outlet and a discharge piping which can be efficiently used in connection with standpipes or discharge piping which is supported and anchored independently of the pump and eliminates the possibility of the large discharge piping, with its heavy load of the slurry being pumped, transmitting excessive stress to the pump case and frame.

It is still another object of the present invention to provide a novel coupling unit for use in association with centrifugal pumps of the type wherein the pump casing has a rubber lining and wherein the coupling, adapted to be connected between the casing outlet and a discharge pipe, has embodied with the relatively movable sections or sleeves thereof, a rubber lining which extends over flanged terminal portions of the coupling sections to provide sealing gaskets between the flanges of the sections and the flanges of the pump case and the discharge piping between which the coupling is mounted.

The present invention contemplates the provision of a tubular unit or section adapted to be inserted coaxially of and between the centrifugal pump casing outlet and a discharge piping or standpipe. Such tubular unit, constituting the novel coupling, embodies two telescopically joined sections, one of which sections forming or constituting a packing sleeve, being permanently bolted or secured at one end to the standpipe and the other of the sections being flanged and adapted to be bolted to the pump casing outlet. The said other one of the sections has a substantial portion of one end slidably inserted into the standpipe attached section which forms the packing sleeve and which carries a gland packing and packing ring to maintain a fluid-tight joint between the sections.

The sections of the tubular coupling unit are permanently connected together by draw bolts and these draw bolts are employed for effecting the axial movement of the coupling section which is joined to the pump casing outlet, relative to said outlet for separating the pump casing from the coupling or for re-establishing a fluid-tight connection therewith. Thus, by the provision of the telescopically joined sections of coupling and the draw bolts by means of which one of the sections can be axially moved with respect to the other section, the coupling when installed between the pump casing outlet and the standpipe becomes a permanent part of the connection between the pump and the standpipe and may be shortened or lengthened as required for the purpose of removing the pump and replacing it in position.

In the drawing:

FIG. 1 is a view in side elevation of a portion of a centrifugal pump showing the adjustable sleeve coupling of the present invention installed between the pump outlet and the lower end of an overlying suspended standpipe;

FIG. 2 is a vertical section on an enlarged scale taken approximately on the line 2—2 of FIG. 1;

FIG. 3 is a transverse section taken substantially on the line 3—3 of FIG. 2;

Figure 5:
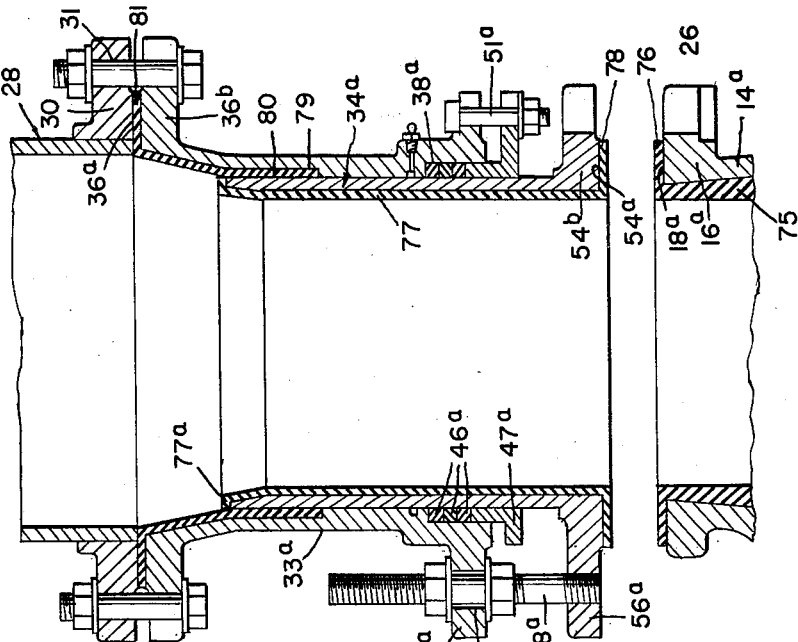
FIG. 5 is a sectional view corresponding to FIG. 4 and illustrating the adjusted position of the discharge sleeve with respect to the pump case outlet preparatory to the movement of the pump casing into or out of operative relationship with the adjustable sleeve coupling.

Referring now more particularly to the drawing, the numeral 10 generally designates a modern centrifugal sand pump.

The pump embodies a removable rotor casing 12 which is provided with a discharge 14 here shown as being upwardly directed but which may be otherwise positioned where it may be desirable to turn the pump or rotor casing for horizontal discharge.

The discharge or pump case outlet 14 in the form here illustrated is defined by the encircling bolt and packing flange 16. In this form of the pump casing the flange has a flat top face 18 which is provided with an annular packing ring groove or channel 20 which channel, as illustrated, is fitted with a packing ring 22. This flange, however, may be modified for coaction with a different type of packing or gasket as hereinafter described.

The flange 16 includes a plurality of radially projecting ears 24 which are provided with outwardly opening bolt receiving slots 26.

The numeral 28 generally designates a standpipe or discharge piping with which the casing discharge is coupled. This standpipe is here illustrated as being of somewhat larger inside diameter than the diameter of the pump casing discharge, but it is, of course to be understood that this is in no way limiting upon the invention since the standpipe may be of the same size as the pump case discharge.

Encircling the downwardly directed end of the standpipe 28 is the bolt flange 30 which is provided with a suitable number of bolt openings 31 for reception of tie bolts or coupling bolts, as hereinafter described.

The present improved adjustable discharge sleeve connection is generally designated 32. This connection embodies two telescopically joined sections. One of the sections which will be defined as the packing sleeve is designated 33 while the other section which wil be defined as the discharge sleeve is designated 34.

The packing sleeve has a short outwardly flared upper end portion 35 which at its maximum inside diameter corresponds to the inside diameter of the standipipe 28 into which it discharges and this upper portion of the packing sleeve is defined by the encircling bolt flange 36 having the outwardly opening slots 37 corresponding in number with the bolt holes 31 of the standpipe flange 30.

The lower end of the packing sleeve 33 has the inner wall thereof provided with the gland packing ring recess 38 and this lower end portion of the packing sleeve is also provided with the encircling bolt flange 39. This flange embodies a series of radially extending slotted bolt ears or lugs 40 and the slots in these ears or lugs are designated 41.

In addition to the lugs or ears 40, the flange 39 is provided with at least two radially projecting draw bolt lugs 42. These draw bolt lugs are of considerably greater width in the circular direction of the flange than are the lugs or ears 40 and each of the draw bolt lugs is provided with an arcuate slot 43 which extends in the circumferential direction of the flange and the arc of which is struck from the center of the packing sleeve 33.

Inwardly of the recess 38 in which packing rings are positioned, the inner wall of the packing sleeve has formed therein a grease groove of channel 44 and this communicates with a radial bore 45 which opens through the outer wall of the sleeve and provides means for injecting lubricant into the groove or channel for the purpose about to be described.

The channel 38 receives a suitable number of gland packing rings 46 and these packing rings are compressed in the conventional manner by the metal gland ring 47 which is of suitable diameter to slip into the recess and which is defined at its outer end by the flange 48. This flange is formed with a number of radially directed lugs 49 each of which has an outwardly opening slot 50 and the slots of this flange are positioned to be aligned with the slots 41 of the lugs 40 to receive gland ring bolts 51 which function in the obvious manner to draw the gland ring upwardly or inwardly and thus compress the packing rings.

The inside diameter of the gland ring 47 is, of course, the same as that of the lower portion of the packing sleeve 33 or, in other words, of that portion of the packing sleeve lying between the channel 38 and the flared upper portion 35.

The discharge sleeve has a body portion of substantial length which is of an outside diameter to be snugly slidably received in the packing sleeve 33 and within the gland packing rings 38 and the gland ring 47.

The inner end of the discharge sleeve 34 may be straight or flared out slightly as indicated at 52 according to whether or not the upper end portion 35 of the packing sleeve is of enlarged diameter to properly join with a standpipe having a diameter larger than the diameter of the pump casing outlet 14. In the case of the enlarged portion 35 of the packing sleeve the flare of the discharge sleeve may be such as to have the angle of the inner face thereof approximately the same as the angle of the face of the inner portion 35 so that liquid flowing through the connection from the sleeve 34 into and through the sleeve 33 to the standpipe will flow with a minimum of turbulence. Where the diameter of the standpipe and of the pump casing may be the same, the packing sleeve may be straight, as stated.

The outer end of the discharge sleeve 34 is encircled by the flange 53. This flange includes in its structure a number of radially extending slotted bolt lugs 54, corresponding in number with the slotted bolt lugs 26 of the flange 16. The slots of these lugs 54 are outwardly opening as shown.

The flange 53 also includes as a part thereof apertured draw bolt lugs 56 corresponding in number with the slotted lugs 42. The apertures 57 of the lugs 56 are threaded for connecting the lugs 56 with draw bolts 58.

The draw bolts 58 have a short portion of the lower end threaded as at 59 for connection in the threaded opening 57 and a substantial length of the upper portion is likewise threaded as indicated at 60 and this threaded upper portion extends freely through the arcuate slot 43 of a draw bolt ear 42 lying over the ear 56.

The threaded portion 60 of each draw bolt carries the upper and lower adjusting nuts 61 and 62 respectively which have between them the slotted draw bolt lug 42 and between which nuts and the adjacent surfaces of the lug 42 are interposed washers 63.

The connection 32 when in operative position is interposed, as illustrated in FIGS. 1 and 2, between the flange 16 on the pump outlet and the flange 30 on the end of the standpipe or discharge piping 28 and the flange 53 of the discharge sleeve 34 bears upon the gasket or packing ring 22 and the flanges are coupled and drawn together by a series of nut and bolt connections, the bolt being designated 64 and the nut thereon being designated 65. These bolts are positioned in the aligned slots 26 and 55 of the lugs 24 and 54 respectively and, of course, are tightened by the nuts 65 to draw the flanges firmly together against the packing 22.

The top end of the coupling has the flange 36 thereof in opposed operative relation with the flange 30 and a suitable gasket 66 is placed between these flanges and the flanges are connected by nut and bolt couplings, as shown, the bolts 67 being engaged in the radial slots 37 of the flange 36 and having their upper ends extended through the openings 31 in the flange 30 to receive the nuts 68 by means of which the flanges are drawn together in the obvious manner.

The circular pump structure or pump case, together with the coupling unit, is supported upon a pair of shim bars or bed rails through the medium of the case feet. One only of such shim bars or bed rails is here illustrated and is designated 69 and the case foot resting thereon is designated 69a. Where the discharge piping or standpipe is suspended from overhead, then the pump casing outlet will be directed upwardly as shown in axial alignment with the standpipe and with the adjustable coupling structure interposed between the case outlet and the standpipe, as shown.

It will, of course, be obvious that while in the illustration of the invention the circular pump casing has been shown set with the discharge 14 directed upwardly, the casing can be rotated or placed in position on the shim bars or bed rails for top horizontal discharge or bottom horizontal discharge for connection with the inlet end of a horizontally disposed discharge pipe. In such case of setting the casing in a different position from that illustrated or, in other words, regardless of the position of the discharge for the case, the case feet will rest on the shim bars or bed rails, the case feet being moved on the case pattern accordingly.

When it becomes necessary to service the circular pump or to replace it, the adjustable coupling provides the necessary spacing between the pump outlet and the standpipe to facilitate the removal of the pump casing and this spacing is effected by manipulation of the nuts 61 and 62 on the draw-bolts 58 in the following manner.

The bolts 64 would first be loosened or removed as obviously would be necessary, after which the nuts 62 on the two or more draw-bolts are run down away from the undersides of the slotted lugs 42. Following this, the uppermost nuts 61 are threaded down on the draw-bolts 58 and this operation will, of course, force them against the top surfaces of the lugs 42 and result in drawing the bolts upwardly through the lugs and at the same time also drawing up the discharge sleeve 34 away from the flange 16 of the pump casing outlet.

By the provision of the grease channel 44 and the grease hole or opening 45, lubricant can be introduced between the contacting opposing faces of the two sections or sleeves 33 and 34 so that the sliding of the discharge sleeve in the outer or packing sleeve 33 will take place easily and without friction.

In the replacement of the pump on the supporting ways or bed rails 69, the reverse operation is effected, namely, the uppermost nuts of the draw-bolts will be run up on the bolts and the lower nuts 62 will be threaded upwardly to impose force against the under faces of the lugs 42 and force the discharge sleeve downwardly onto the packing 22. In the event that an exact alignment is not effected between the slotted bolt lugs 24 and 54 in this replacement of the pump casing, slight angular adjustment can be effected by turning the discharge sleeve 34 on its axis, due to the provision of the arcuate slots 43 in the lugs 42 through which the draw-bolts extend.

Also it will be seen that if there is any slight misalignment between the bolt openings in the flange 36 of the packing sleeve and the bolt holes 31 in the flange of the discharge piping, the desired rotation or angular adjustment of the packing sleeve can be effected due, also, to the provision of the arcuate slots 43 in the lugs 42.

It will be obvious that the discharge piping must be supported and anchored independently of the pump, which eliminates the possibility of the large discharge piping, with its heavy load of slurry being pumped, transmitting excessive stress to the pump casing and frame. Due to the interior formation of the sections of the adjustable sleeve, the flow pattern through this adjustable sleeve is very uniform and smooth, thereby ensuring long wear life and pump efficiency.

It is also to be mentioned that whereas the illustration of the invention shows the adjustable coupling structure connected with the discharge of the pump casing, it may also be effectively used in connection with the pump intake where such use may be found desirable.

Figure 4:
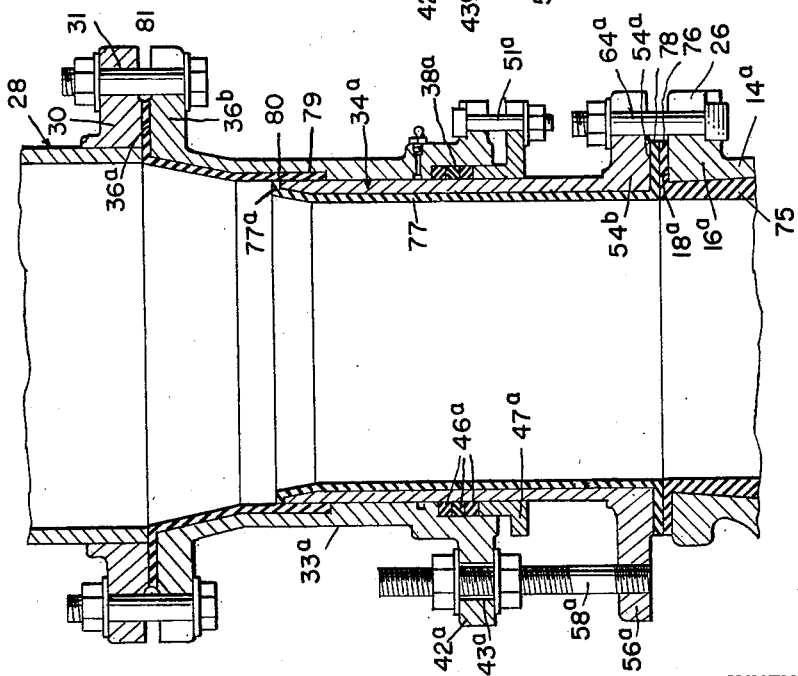
FIG. 4 is a longitudinal sectional view through the modified coupling structure showing the same connected with the flanged outlet of a rubber lined pump case and with the flange of a discharge piping.

The present adjustable coupling structure is also designed in the modified form shown in FIGS. 4 and 5 for cooperative relation with a rubber lined pump case, in which connection the discharge sleeve and packing sleeve would be rubber lined.

In FIGS. 4 and 5 the discharge piping is shown in the same form as in FIGS. 1 and 2 where it is designated 28 and it is provided with the apertured flange 30 having therein bolt receiving openings 31.

The pump casing outlet is here designated 14a and terminates in the encircling flange 16a having the flat top surface 18a and this flange, as in the preceding form of the invention, is provided with the bolt slots or recesses 26a.

The numeral 75 designates the rubber lining of the pump case which is carried over and laterally onto the top surface 18a of the flange 16a forming the gasket annulus 76 which in fact constitutes a lateral flange portion of the liner 75, as illustrated.

The numerals 33a and 34a designate respectively the packing sleeve and the discharge sleeve of the coupling corresponding to the parts 33 and 34 of FIG. 2.

The discharge sleeve 34a has its inner face covered with the rubber lining 77 which at its lower end is carried laterally outwardly across the under face 54a of the discharge sleeve flange 54b to form the annular gasket 78 which, when the flanges 16a and 54b are drawn together, is compressed against the gasket 76.

The liner 77 is carried to the upper or inner end of the discharge sleeve 34a and turned out across the top edge of the sleeve as indicated at 77a.

The packing sleeve 33a is of the same form as the sleeve 33 with the exception that the inner surface of the wall thereof is recessed from approximately midway of its length to the top end thereof, as indicated at 79. The surface of this recess 79 is covered with a rubber liner 80 the thickness of which fills out the recess to approximately the same inside diameter as the lower portion of the packing sleeve in the area thereof lying above the gland packing ring recess 38a. The liner 80 extends, as stated, to the top end of the packing sleeve and is then carried laterally or outwardly across the top surface 36a of the flange 36b to form a top sealing gasket 81.

When the discharge sleeve flange 54b and the flange 16a of the pump case outlet are in proper alignment for coupling together, such coupling is effected by conventional bolts 64a as shown, and as previously stated, the gaskets 76 and 78 will be drawn tightly together functioning in the same capacity as the gasket 20 hereinbefore described.

The alignment of the recesses in the flanges 16a and 54b for the coupling bolts is effected through the medium of the slotted ears 42a through the slots 43a of which extend the draw-bolts 58a as in the first described embodiment of the invention, the draw-bolts being secured in the lugs 56a carried by the lower end of the discharge sleeve 34a.

All of the other elements of the coupling, such as the packing rings 46a, the gland ring 47a and the bolt means 51a for compressing the packing rings are the same as in the first described structure and accordingly further and more detailed description of the same is not required.

While in this second embodiment the discharge piping has been illustrated as being of larger diameter than the pump case outlet and, therefore, the upper end of the packing sleeve is flared so as to have the same inside diameter of the rubber lining 80 as that of the discharge piping, it will, of course, be evident that the discharge piping may be of any size relative to the pump case outlet. Also while the inner end of the packing sleeve has been flared slightly, this may be straight, particularly in the case of having the discharge piping of the same diameter interiorly as the pump case outlet.

It will also be apparent that the packing sleeve rubber lining 80 is overlapped by the inner end of the discharge sleeve 34a and that the laterally turned portion 77a of the rubber lining is close to and engages the face of the lining 80 so that abrasive material carried by fluid passing through the coupling will not impinge upon any metal portion of the coupling.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. In combination, a pump casing designed for pumping liquids containing solid particles and including intake and discharge openings, an adjustable sleeve connected to the pump casing and in communication with one of said openings, a discharge pipe, said adjustable sleeve assembly comprising a tubular discharge sleeve connected to one of the pump casing openings at one end and being of substantially constant diameter throughout its length, a tubular packing sleeve slidably and telescopically receiving the other end of the discharge sleeve in one end portion thereof, the other end of the packing sleeve comprising an outwardly flared portion terminating in an annular flange connected to the discharge pipe, the central portion of the packing sleeve being provided with an annular recess extending to the inner surface of the flared portion, a first lining of elastomeric material filling said annular recess and extending over the inner surface of the flared portion and the outer end of the flange, the other end of the discharge sleeve being internally flared at the same angle as said flared portion of the packing sleeve, a second flange provided on the one end of the discharge sleeve, a second lining of elastomeric material covering the entire inner surface of the discharge sleeve and extending over the flared end thereof as well as the second flange, the end of the second lining remote from said second flange extending radially over the other end of the discharge sleeve and into sliding contact with the inside of the first lining, adjustable securing means extending through said second flange and pump casing and urging the second flange toward said pump casing so as to compress a portion of the second lining therebetween, a third flange provided on the one end portion of the packing sleeve between the first flange and the second flange, said third flange being provided with a plurality of spaced arcuate recesses concentric about the axis of the adjustable sleeve, a plurality of adjusting studs each having one end releasably secured to the second flange and a threaded end extending through one of the arcuate recesses, a pair of nuts threaded on each stud on opposite sides of the third flange and in tight engagement therewith, sealing means between the one end portion of the packing sleeve and the outer surface of the discharge sleeve, a lubricating groove formed in the inner surface of the packing sleeve and closed by the outer surface of the discharge sleeve, and means provided on the packing sleeve for filling said groove with lubricant.

2. In combination, a centrifugal pump including a casing having an opening formed therein, piping fixedly mounted in a non-movable position and having an end opening axially aligned with said first-mentioned opening, coupling means between the fixed piping and said opening in said casing wherein the end of the coupling means adjacent the pump casing opening may be axially shifted to provide desired clearance to permit removal of the centrifugal pump from its working location, said opening in said casing being defined by an encircling bolt and packing flange, a packing ring supported by said flange, said packing flange including a plurality of radially projecting circumferentially spaced ears each provided with an outwardly opening bolt receiving slot, said fixed piping having an open end portion encircled by a first bolt flange provided with a plurality of bolt openings formed therethrough, said coupling means including a substantially cylindrical packing sleeve having a second bolt flange at one end portion thereof having outwardly opening bolt receiving slots formed at circumferentially spaced portions thereabout corresponding in number to the bolt openings formed in said first bolt flange, a gasket between said first and second bolt flanges, separate bolts disposed in the slots formed in said second bolt flange and extending through the openings in said first bolt flange for drawing said first and second bolt flanges together, the inner surface of said packing sleeve adjacent said one end portion being flared outwardly toward the said one end portion of said packing sleeve, the opposite end portion of said packing sleeve being provided with a recess in the inner wall thereof and including a third bolt flange encircling said opposite end portion, said third bolt flange including a plurality of circumferentially spaced radially extending ears having outwardly opening slots formed therein, said third bolt flange further including a plurality of circumferentially spaced radially outwardly extending draw bolt lugs, each of said draw bolt lugs being provided with an arcuate circumferentially extending slot formed therethrough concentric the axis of said packing sleeve, a discharge sleeve having an outside diameter snugly slidably received within said packing sleeve for axially telescopic movement therewithin, said discharge sleeve being substantially cylindrical in configuration and having formed at one end thereof on the inner surface thereof an outwardly flared portion with the surfaces of said flared portions on the packing sleeve and the discharge sleeve defining substantially the same angle to the longitudinal axis of said sleeves, sealing packing means disposed within the recess in said packing sleeve and engaging the outer surface of said discharge sleeve to provide a fluid seal between said two sleeves, a ring slidably positioned on the outer surface of said discharge sleeve and including a portion adapted to extend into said recess in the packing sleeve to engage said sealing packing means, said ring including an outwardly extending flange defining a plurality of circumferentially spaced lugs each of which has an outwardly opening slot formed therein, separate ring bolts disposed within the outwardly opening slots formed on the ring and on the third bolt flange for urging said ring into operative position, said last-mentioned separate bolts being movable into and out of operative position in a radial direction through the outwardly opening slots, the opposite end portion of said discharge sleeve being encircled by a fourth flange, said fourth flange including a plurality of circumferentially spaced radially extending ears having outwardly opening slots formed therein, separate bolts disposed in said outwardly opening slots formed in said packing flange and said fourth flange for drawing said fourth flange against said packing ring, said last-mentioned flange also including a plurality of circumferentially spaced radially extending draw bolt lugs, each of said draw bolt lugs having a threaded opening formed therein, a plurality of draw bolts, each of said draw bolts having a threaded end portion threaded into the threaded openings in the draw bolt lugs on the flange of said discharge sleeve, the opposite end portion of said draw bolts being threaded and extending freely through the arcuate slots formed in the draw bolt lugs on said packing sleeve, adjusting nuts threaded on the last-mentioned threaded end portions of said draw bolts on opposite sides of the draw bolt lugs formed on the packing sleeve for clamping the draw bolt lugs between said adjusting nuts, said arcuate slots permitting relative angular movement of said packing sleeve and said discharge sleeve so as to permit readly alignment of the bolt receiving openings in the said first bolt flange and second bolt flange as well as in said bolt and packing flange and the flange formed at one end portion of said discharge sleeve.

References Cited in the file of this patent
UNITED STATES PATENTS

| | | |
|---|---|---|
| 656,023 | Kenney | Aug. 14, 1900 |
| 1,182,146 | Crispin | May 9, 1916 |
| 1,249,572 | Weitling | Dec. 11, 1917 |
| 2,184,116 | Eastman | Dec. 19, 1939 |
| 2,780,482 | Brown | Feb. 5, 1957 |
| 2,849,960 | Olmstead et al. | Sept. 2, 1958 |
| 2,955,850 | Bellinger | Oct. 11, 1960 |
| 3,008,735 | Wijngaarden | Nov. 14, 1961 |